United States Patent Office 3,079,852
Patented Mar. 5, 1963

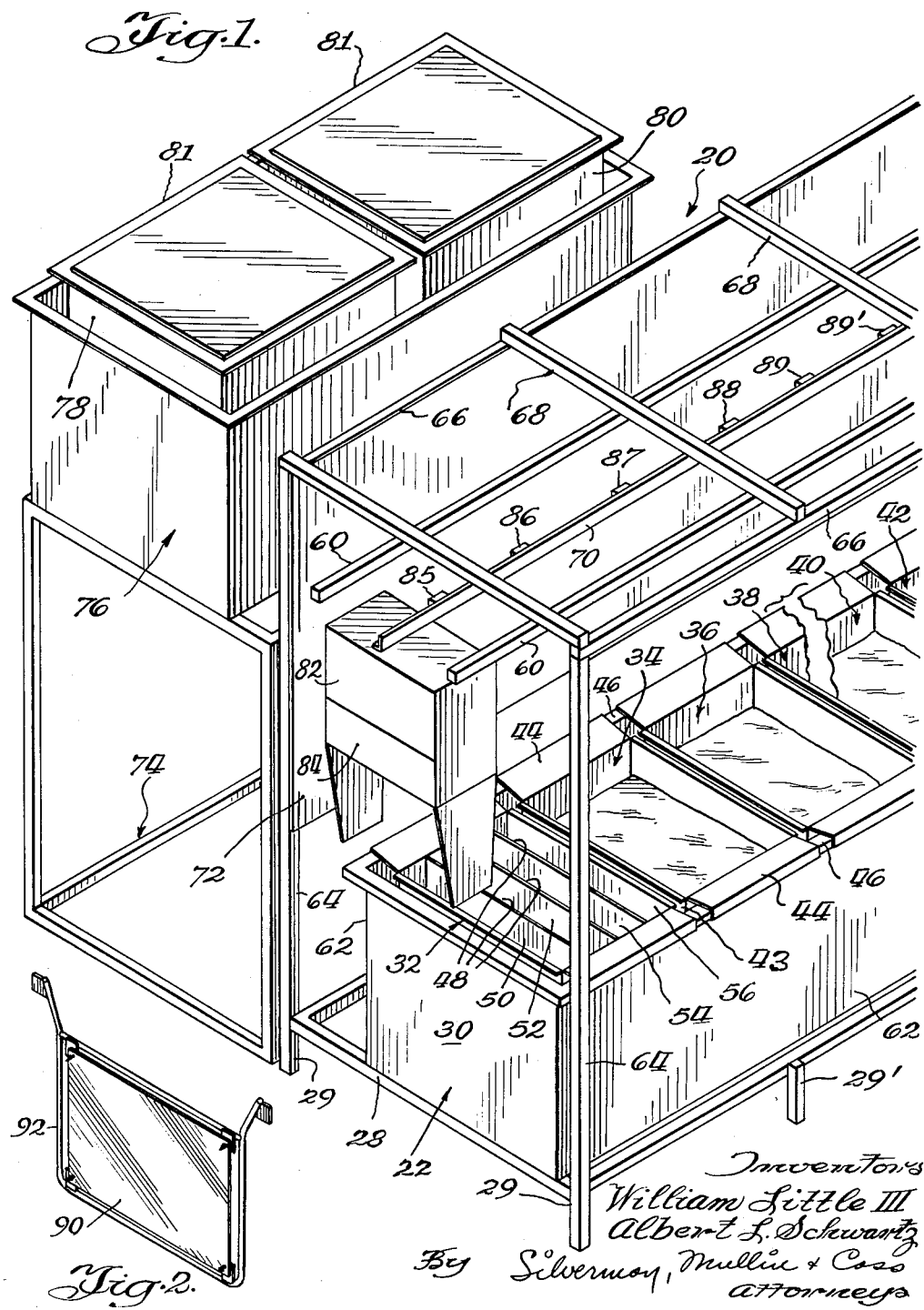

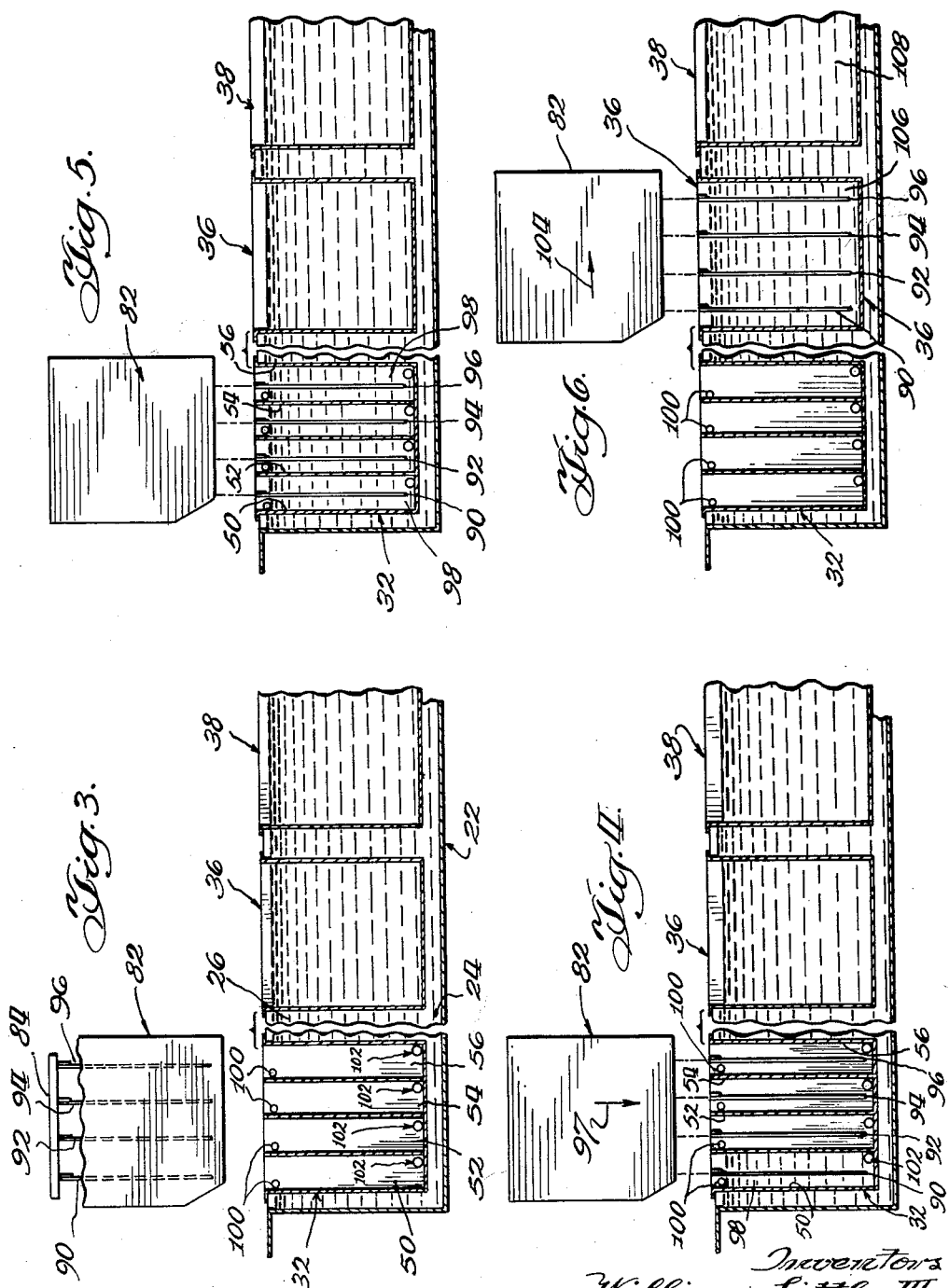

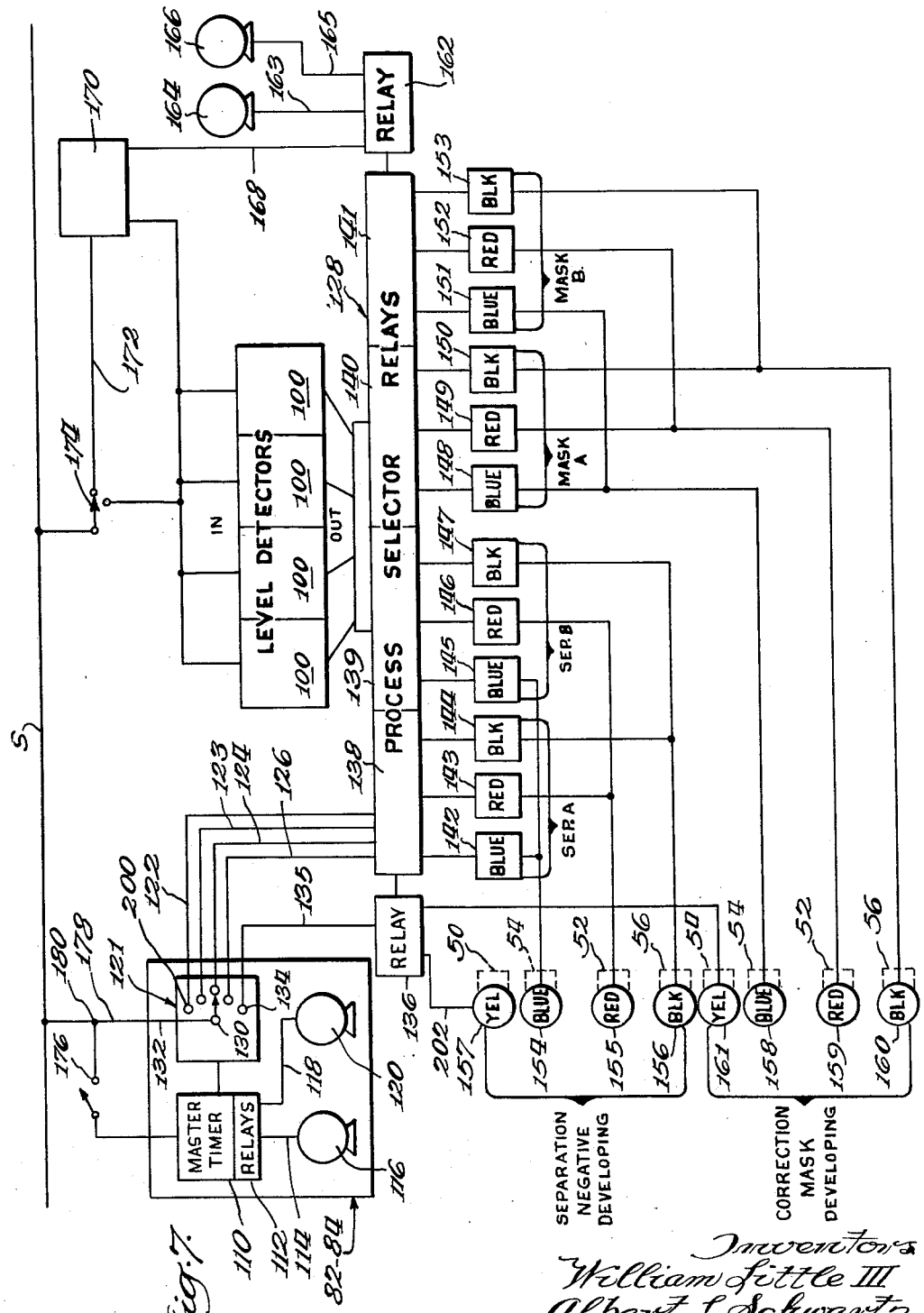

3,079,852
AUTOMATIC PHOTOGRAPHIC FILM
DEVELOPING APPARATUS
William Little III, Glenview, and Albert L. Schwartz, Chicago, Ill.; said Schwartz assignor to said Little
Filed Dec. 11, 1961, Ser. No. 158,324
20 Claims. (Cl. 95—89)

This invention relates generally to photographic film processing apparatus and more particularly, relates to a novel automatic apparatus for developing photographic film used in process color reproduction by photolithography and photoengraving at high speed on a commercial basis.

The apparatus embodying the invention is especially concerned with processing of color process films, such as, color separation negatives, color correction and other types of masks and screen positives and negatives employed in making printing plates for full color reproduction. Such color process films comprise sheets of transparent, flexible plastic film and heretofore, developing of such film has involved a series of manual operations restricting the quantity of production of the developed film and the quality thereof unless great and extreme care was exercised. A resumé of the general procedure involved in making the color process film, such as separation negatives, will assist in an understanding of the improvements contributed by the invention.

Initially, the subject matter to be reproduced in full color by a multi-color printing process is photographed using conventional photographic color film and a transparency is produced which serves as a reference copy. The transparency then is selectively photographed using appropriate color filters in a color separation procedure to provide a black and white negative for each particular color of the color process to be followed. In the four-color process, four-color negatives are made, one each for yellow, red, blue and black, whereas in the three-color process, for economy in engraving and printing, the black color negative is omitted. Thus, the color separation procedure produces a separate photographic film negative for each color involved and the color during the printing process is realized by the particular inks used. The same procedure is followed for so-called flat art work desired to be reproduced in full color, however, color separation is direct and no transparency is made.

After the color process films have been exposed they are immersed in processing fluids by means of which they are developed, fixed and washed and thereafter they are dried. Heretofore, such processing of color process negatives has been a manual operation. Each of the color separation negatives, for instance, must remain in the developing liquid a predetermined length of time which is different for each film negative. The set of color process film negatives produced for each reference copy or color positive must not be intermixed and confused with film negatives of other sets. The practice has been to process only one set of film negatives in a developing tank at any time handling each film negative separately in order to avoid scratching and marring of the exposed photosensitive emulsions. Great care had to be exercised by the operator in handling the exposed films to avoid creasing and marring of the films, which of course, were slippery and wet to the touch after immersion in the processing liquids. After developing, the exposed films had to be fixed and washed, all of which was done manually, one exposed film at a time. Since the developing procedure was carried out in the dark, the manual operations described hereinabove were considerably complicated. The procedure has been time-consuming and costly and has required highly trained and skilled operators. Moreover, the essentially manual operation involved caused the quantity and quality of production to be completely dependent upon capabilities and skills of the individual operators.

In specific instances, attempts have been made to provide automatic apparatus for processing of photographic film and this has been realized in various degrees of success in the field of ordinary color print processing and black and white print processing. Thus, special tanks and baskets for the photographic film have been devised in this special field, but insofar as we are aware, desirable automatic apparatus for processing of color process films has not been available heretofore.

One of the reasons for this long felt need will be apparent from the nature of the developing process heretofore discussed in connection with color process films wherein each of the color separation negatives, for instance, is required to remain in the developing liquid for a different length of time. Thus, it has not been possible, by mechanical apparatus, to develop all of the color separation negatives of a particular set obtained from the reference copy in the same liquid bath at the same time. In addition, processing equipment has not been available that could be used both for developing exposed color separation negatives and color correction and other types of masks which require different strengths and/or types of developing solutions as well as different immersion times in the developing solutions. Another reason for the lack of such automatic processing equipment can be attributed to the requirement for uniformity of exposure of the photographic film transparencies to the chemical action of the photographic developing and fixing solutions employed and this has required uniformity of concentration of said solutions in the tanks in which the film transparencies are immersed. In this connection it may be noted that photographic film and solutions do vary between manufacturers thereof thereby raising the problem of apparatus suitable for handling all of the different commercially available photographic supplies.

Photographic masks are made by producing film negatives and/or positives and using these in combination with separation negatives and positives to compensate for overlappings of the spectro-reflective qualities of process color inks. Such masks include also undercover removal masks, highlight masks, two-stage masking, masks for negative color and positive masks for negative color processing. All of such masks, including color correction masks herein referred to have in common with color separation negatives the need for immersion of the different process color films in developing fluids for different periods of time. Consequently, the invention is adaptable for use in connection with all kinds of photographic masks, as well.

For reasons specified above, as well as others, it is believed that upon a large scale, commercial basis there has not been available automatic apparatus for developing color process films for use in process color reproduction. Further, there has not been available automatic apparatus of this general character which could selectively process separation negatives, color correction and other types of masks, and screen positives and negatives for making color printing plates for full color reproduction by photolithography and, photoengraving. Accordingly it is a primary object of the invention to provide automatic photographic film developing apparatus of the character described which is capable of successfully carrying out the various developing techniques referred to on a commercial, large scale basis.

A major object of the invention is to provide automatic photographic film developing apparatus of the character described which can be used successfully for processing any color process films such as, separation negatives, color correction masks, screen positives and negatives, all in the multiple color process reproduction art.

In conjunction with the major objects of the invention there are many ancillary objects which derive from various novel structural components and combinations of components utilized in the automatic apparatus which enable the apparatus embodying the invention to be used successfully on a large scale, commerical basis heretofore not obtainable in this specialized field of endeavor. The invention encompasses these additional objects which will become apparent from the detailed disclosure of a preferred embodiment of the invention that ensues.

It is contemplated that minor variations in the size, arrangement, construction and proportions of the several parts and combinations of parts of the automatic apparatus embodying the invention may occur to the skilled artisan without departing from the scope or sacrificing any of the advantages thereof.

In the drawings:

FIG. 1 is a fragmentary diagrammatic perspective view of the automatic apparatus embodying the invention, portions of the external frame structure and operating components being illustrated and portions are omitted for clarity.

FIG. 2 is a perspective view of a holder frame for a film transparency, said frame having a color process film thereon for processing by the apparatus of FIG. 1.

FIGS. 3 through 6 are diagrammatic views showing the step-wise operation of the apparatus of FIG. 1 for developing, fixing and rinsing a set of four different color separation negatives simultaneously during one cycle of operation of said automatic apparatus, portions being broken away to illustrate details of the apparatus.

FIG. 7 is a detailed diagrammatic illustration of the operation of the various component parts of said automatic apparatus, including electrical circuitry employed to achieve the desired functions of the apparatus.

Referring now to the drawings, in FIG. 1, the reference character 20 designates the automatic apparatus embodying the invention, only a major portion of which is shown. Said apparatus 20 includes an elongated tank 22 open at the top end and preferably of a suitable metal, such as stainless steel, which is resistant to chemical solutions used in photographic developing techniques. Tank 22 preferably is of double-walled construction, as seen in FIGS. 3 through 6, to provide a suitable jacket 24 for circulating water 26 around the various reservoirs or process tanks provided along the length of said tank to maintain processing fluids employed at desired temperatures. However, other structural means may be feasible for such temperature control of processing fluids. The tank 22 is supported on an open rectangular frame 28 carried on legs 29 and 29′ suitably spaced along the length thereof for desired stability.

The tank 22 is divided along the length thereof into a series of individual compartments or reservoirs commencing at one end 30, seen in FIG. 1, to the opposite end of the tank 22 which is not shown. The reservoir 32 is a processing tank and is sectioned or compartmentized and is adapted to contain developer. Processing tank or reservoir 34 provides a single compartment which likewise is adapted to contain developer; reservoir 36 is to contain a short stop bath; reservoir 38 to contain hypo or a fixing bath; reservoir 40 to contain water and reservoir 42 to contain hypo-removing solution. Additional reservoirs beyond reservoir 42 are provided, although not specifically shown, for wash solutions, etc. The precise number of individual reservoirs may vary depending on the sophistication of operation of the apparatus desired. As seen in FIG. 3, the various reservoirs are separated one from the other along the length of the tank. The individual reservoirs may be provided by suitable metallic vessels, such as vessel 43, inserted downwardly into the tank and having oppositely extending channel-shaped flanges 44 which seat across the upper longitudinal edges 46 of the tank. Thus, each of the vessels 43 can be removed through the upper open end of the tank merely by lifting flanges 44 from edges 46 for cleaning and servicing of the vessels and component parts associated therewith and tank 22.

The processing tank 32 is divided by the three, transverse upstanding, parallel plates 48 into a series of four consecutive compartments 50, 52, 54 and 56 each open at the upper end thereof. Although the processing tank 32 has been located next adjacent end 30 of the tank, it may be interchanged in position with the reservoir 34 without adversely affecting operation of the apparatus 20.

Supported spaced above the upper open ends of the individual reservoirs of the tank, are a pair of parallel spaced apart guide rails or tracks 60. The guide rails 60 extend the entire length of the tank 22 intermediate the opposite sides 62 of the tank. The frame 28 upon which the tank 22 is supported is secured between pairs of standards 64, there being another pair of standards at the opposite end of the tank, which is not illustrated. The pairs of standards 64 are connected between upper ends thereof by longitudinally extending frame members 66 and the frame members 66 are braced by the cross-struts 68. As seen in FIG. 1, the legs 29 comprise the bottom ends of the vertically arranged standards 64 while legs 29′ are short members attached at intervals along the frame 28. The rails 60 are secured to the undersides of cross-members 68 and intermediate the rails 60 and parallel therewith is an angle iron track 70 the purpose of which will be described subsequently herein. The frame 28 and members 64, 66 and 68 are formed of conventional structural members and secured together by known means such as welding, bolts or the like. Thus, frame 28 is horizontally arranged along the length of the apparatus while members 64, 66 and 68 form a vertically arranged, open rectangular frame in which tank 22 is located supported on frame 28. A splash plate 72 is secured to members 64 behind tank 22.

Supported on top of the open box-like frame 74 is a second double walled tank 76, the tank 76 being divided into a pair of reservoirs 78 and 80. Reservoirs 78 and 80 preferably are closed at their upper ends by suitable covers 81 conveniently provided in a well known manner. The frame 74 is next adjacent the members 64 so that the reservoirs 78 and 80 are in closed proximity to the reservoirs of tank 22 and elevated relative thereto. For purposes of description, reservoir 78 is adapted to contain developer solution for processing color separation negatives and reservoir 80 is adapted to contain developer for color correction masks. Although not shown, apparatus 20 can be provided with additional reservoirs for developing fluid to process other types of masks and screen positives and the like, all within the basic framework of the invention.

At this point in the disclosure, it may be noted that FIG. 1 does not illustrate the various piping, circuitry, controls, pumps and gauges, etc. with which the apparatus 20 is provided for performing the functions thereof. These have been omitted in FIG. 1 for the sake of clarity, but their provision and operation will be described in detail in connection with FIG. 7 subsequently herein. Further, various parts and apparatus will be described which can be incorporated into the basic apparatus 20, as shown.

Mounted on the rails 60 for longitudinal movement therealong is a carriage head 82. The carriage head 82 carries a retractile carriage 84 movable in a vertical plane normal to the rails 60. Although not specifically shown, the carriage 84 can be connected by suitable pinions to rack members on opposite sides thereof for reciprocating vertical movement, there being various well-known rack and pinion translating means available for this purpose. Such familiar rack and pinion means can be used for head 82 and rail 70. Mounted on angle iron 70 at selectively spaced intervals therealong are micro-switches, such as, 85, 86, 87, 88, 89 and 89′ illustrated in FIG. 1, however, additional switches will be provided for controlling, dictating and initiating various movements of the control head 82 and its associated carriage 84, as will be explained.

It will be understood that piping, valves, pumps, etc. providing controlled conduit connections between reservoirs 78 and 80 respectively and reservoirs 32 and 34, including the individual compartments of reservoir 32, are contemplated. The precise physical nature of these components are well-known generally and their incorporation into the apparatus 20 will be explained in detail in connection with FIG. 7 herein.

*Program of One Complete Operation Cycle of Apparatus 20*

A complete cycle of operation for developing color separation negatives will be described with reference to FIGS. 3 through 6. Such a color separation negative 90 is shown in FIG. 2 supported on a film holder 92 which can be used with the apparatus 20. The holder 92 is described and claimed in the co-pending application of William Little III, Serial No. 104,426 and a co-inventor of the herein invention. The holder 92 is suitable for use in a darkened room in which apparatus 20 will be operated and for installation on carriage 84. The head 82 is shown in starting position adjacent end 30 in FIG. 1.

As seen in FIG. 3 the carriage 84 has four color separation negatives 90, 92, 94 and 96 separately suspended therefrom, said negatives representing the individual yellow, red, blue and black color separation negatives respectively to be used in a four-color printing process, for instance. By means of a process selector switch, apparatus 20 is programmed to perform the complete cycle for developing the four separation negatives automatically and the main on-off switch of the apparatus is moved to start the apparatus 20. The control head 82 with carriage 84 mounting the individual holders, such as holder 90, in parallel, spaced vertical planes will move along rails 60 from its starting position adjacent end 30 of the tank 22 until contacting micro-switch 85 (FIG. 1), for instance. The control head 82 stops at a position overlying processing tank 32 and the carriage 84 is lowered, as represented by arrow 97, to deposit all of the color separation negatives into reservoir 32, as seen in FIG. 4. Each of the separation negatives is separately received in one of the compartments of reservoir 32, namely, negative 90 in compartment 50, negative 92 in compartment 52, negative 94 in compartment 54 and negative 96 in compartment 56. When said color separation negatives are first lowered into the various compartments of reservoir 32, said reservoir is empty, as shown in FIG. 3.

After the separation negatives have been lowered into the compartments 50 through 56 respectively, developer solution from reservoir 78 automatically is delivered to the separate compartments of reservoir 32 in a predetermined time sequence related to the length of time each separation negative is required to remain in the developer solution. For instance, the yellow separation negative 90 must remain in the solution for the longest period of time, the red separation negative 92 for the next longest period of time, the blue separation negative 94 for the next longest period of time and the black negative 96 for the least amount of time. To accomplish this, reservoir 78 is connected by separate delivery and return conduits to each of the compartments 50 through 56 respectively. As seen in FIG. 4, first the compartment 50 is filled with developer solution 98 from reservoir 78, preferably by gravity feeding, until a suitable level of solution 98 in compartment 50 is reached for complete immersion of negative 90 and indicated by level detector 100, it being noted that each compartment has its own level detector 100. When the desired level of solution 98 in compartment 50 is reached, the supply of developer from reservoir 78 is cut off automatically by the level detector 100 in said compartment 50.

After a predetermined time lapse following filling of compartment 90, the compartment 52 containing the red separation negative 92 is filled with solution from reservoir 78, the supply of solution 98 being stopped automatically at the desired level by the indicator 100 in compartment 52. After a predetermined time lapse following filling of compartment 52, compartment 54 is filled with solution 98 and following a selected time lapse, compartment 56 is filled. Referring to FIG. 5, the condition where all of the compartments 90 through 96 are filled with developer 98 is shown and all of the color separation negatives are immersed in the developer. It will be appreciated that the yellow, red and blue separation negatives respectively meanwhile remain immersed in the developer while compartment 96 is being filled.

At a predetermined time lapse after compartment 96 has been filled, the carriage 84 is retracted from the reservoir 32 so that all of the separation negatives 90 through 96 are lifted simultaneously from the developer bath. The total amount of time that carriage 84 remains in full lowered position is calculated on the basis of the total amount of time required for the yellow separation negative 90 to remain immersed in solution 98 in compartment 50. For instance, if yellow separation negative 90 must remain immersed in solution 98 for six minutes, then the time interval between complete filling of compartment 50 as seen in FIG. 4 to removal of all of the separation negatives from the developer will be six minutes. During this six-minute interval, the yellow separation negative will have been subjected to the developer for a six-minute interval, the red separation negative 92 for a time period less than six minutes, the blue separation negative 94 for a time period less than that for the red separation negative 92 and finally, the black negative 96, for the least amount of time.

While the separation negatives are immersed in the compartments of reservoir 32, means 102 are provided in each of the said compartments for agitating the developer 98 to maintain uniform consistency thereof while in the compartment. Said means 102 each comprise a gas-burst device or plenum which is connected to a source of nitrogen gas, for instance, the device being a generally cylindrical member mounted transversely adjacent the bottom of the compartment. An example of such a suitable agitation device for dispersing a gas through the developer is described and claimed in co-pending application Serial No. 57,306 of Albert L. Schwartz, a co-inventor herein. Nitrogen, for instance, is bubbled through perforations in the circumferential wall of the plenum 102 at a proper duration, rate and frequency to obtain desired agitation of the solution 98 in the compartment. Means are provided for rendering the means 102 in each compartment 90 through 96 respectively operative at the precise time interval when a separation negative is immersed therein and thereafter, unoperative when the separation negatives are removed from the reservoir 32.

Referring to FIG. 6, the color separation negatives are shown withdrawn from reservoir 32 and the head 82 automatically has moved forwardly in the direction of arrow 104 to a position overlying the reservoir 36, it being noted that in this cycle of operation, reservoir 34 has been skipped since it may not be employed. In this position, the head 82 will have closed micro-switch 87 on rail 70 causing the carriage 84 to be lowered to deposit all of the color separation negatives 90 through 96 into reservoir 36 containing a short stop solution 106. To permit this, switch 86, for instance, will have been rendered inoperative by the process selector switch. The separation negatives remain in the short stop solution 106 for a predetermined time interval after which, the carriage 84 automatically is elevated to remove the negatives from reservoir 36 and the carriage 84 moves forwardly along rails 60 to the next station overlying reservoir 38. The control head closes micro-switch 88 on rail 70 causing the carriage 84 to lower the negatives into a hypo or fixing solution 108 in reservoir 38. After a predetermined length of time in which the separation negatives remain in solution 108, the carriage 84 is raised automatically and the head 82 moves forwardly again along tracks 60. In subsequent sequence, the color separation negatives are deposited in reservoir 40 for washing the negatives and in reservoir 42 containing a suitable solution for removing the hypo. It will be appreciated that more than one wash reservoir 40 may be used which can be interposed ahead of the reservoir 42. After the separation negatives have been processed automatically to develop and fix the desired images thereon, the head 82 moves along rails 60 to a station where the holders 92 are removed and passed on to a drying station outside the room apparatus 20 is located. Then, head 82 with carriage 84 automatically returns along rails 60 to the starting position thereof adjacent end 30 shown in FIG. 1.

As explained, the apparatus 20 is operative for developing correction masks and screen positives and negatives. Considering a complete cycle of operation of the apparatus for color correction masks, reservoir 32 will be utilized in the same general manner as heretofore described for processing color separation negatives. In other words, the respective color correction masking negatives will be lowered into compartments 50, 52, 54 and 56 respectively and each color correction mask will remain in the developing solution for the required time interval in the same manner as heretofore described. However, developing solution will be supplied from reservoir 80, in this instance, which is suitably connected for gravity feeding the developer to the individual compartments 50 through 56 in the predetermined time sequence desired. In general, the cycle of operation of the apparatus 20 for developing color separation negatives and color correction masks will be the same with the exception of the developing solution used for each process and the immersion times in each of the solutions used. The apparatus 20, as will be explained, has a process selector switch for setting the program of operation of the apparatus desired.

Where the apparatus is to be used for developing screen positives, the reservoir 32 will not be used. In this instance, the reservoir 34 is employed which is supplied with developer from a separate tank or filled independently as needed. The developing solution remains in the reservoir during use of apparatus 20 for processing screen positives. In this program of operation of the apparatus which is selected by a suitable process selector switch on the apparatus, the micro-switch 85 will be rendered inoperative while switch 86 will be operative for triggering lowering of the screen positives into the reservoir 34 when head 82 reaches a position overlying said reservoir. The master timer by means of the process selector switch for developing screen positives determines the time interval during which the film transparencies will remain in the developer in reservoir 34. Thereafter, the control head 82 will move along the rails 60 and operate the switches along rail 70 to raise and lower the carriage 84 at the desired times.

Although not shown, the reservoir 34 also is provided with means such as 102 provided in the sectioned reservoir 32 for agitating developer solution therein during the time that the screen positives are immersed in the solution.

*Programming of Apparatus 20*

Referring now to FIG. 7, the electrical circuitry and components employed to obtain desired programming and operation of the apparatus 20 is shown diagrammatically. The control head and carriage associated therewith are shown at 82—84 and connected for operation from a source S of electrical current. The control or robot head 82 has a master timer device 110 which controls a plurality of relays designated 112. One of said relays is connected as by line 114 to a motor 116 which is connected to drive the carriage and head horizontally or along the rails 60. Another of said relays is connected as by line 118 to a motor 120 to drive the carriage vertically for lowering and raising the film transparencies. A bank of process selector switches are represented at 121, said switches individually being connected, as indicated by lines 122, 123, 124 and 126 respectively to a bank 128 of process selector relays. The bank of switches 121 includes an on-off switch 130 connected as by line 132 to the source S for starting and stopping the apparatus. Likewise, switch 134 of said bank 121 is connected as by line 135 to a relay 136 which is similar to the relays 128, but which is controlled directly by the master timer 110.

The bank 128 is comprised of relays identified as 138, 139, 140 and 141, said relays being connected to the process selector switches by said lines 122, 123, 124, 126 respectively. The relay 138 is connected to switch-in delay timers 142, 143 and 144; relay 139 is connected to switch-in delay timers 145, 146 and 147; relay 140 is connected to switch-in delay timers 148, 149 and 150; and relay 151 is connected to switch-in delay timers 151, 152 and 153. The delay timers 142–153 respectively determine the selected time intervals for developing the blue, red and black color separation negatives and color correction masks when immersed in developing solution in the compartments 52, 54 and 56 of reservoir 32. The exception is in connection with the yellow process transparency film the time interval of development in compartment 50 of which is controlled directly by the master timer 110 in the control head 82. A relay 136 is shown connected directly to the head for this purpose. However, the time interval for development in all compartments 50–56 also is dependent upon the setting of the master timer 110 since the several delay timers do not supply an output voltage until their "timed-out" position has been reached.

Continuing with description of the diagrammatic arrangement of FIG. 7, process selector relays 138 and 139 switch-in the delay timers 142–147 and said delay timers 142–147 control operation of solenoid valves 154, 155 and 156 associated respectively with compartments 52, 54 and 56 when the process for developing color negatives is selected by means of the proper process selector switch in bank 121. The process selector relays 140 and 141 switch-in the delay timers 148–153 which control operation of solenoid valves 158, 159 and 160 likewise associated with compartments 52, 54 and 56 when the process for developing color correction masks is switched-in from bank 121. The relay 136 controls the solenoid valves 157 and 161 for the compartment 50 in the color separation developing process and color correction mask developing process respectively. To distinguish between the use of these compartments 50–56 for developing color separation negatives and color correction masks, the diagram of FIG. 7 has been delineated to distinguish between the use of said compartments 50–56 for each process by the legend "separation negative developing" and "correction mask developing" respectively.

As previously explained, each compartment 50 through 56 is connected by suitable individual piping or conduit (not shown) to the reservoirs 78 and 80, the reservoir 78 containing developing solution 98 for color separation negatives and the reservoir 80 containing developer for color correction masks. The conduit connections will include a supply conduit from the reservoir to each compartment and a return conduit from each compartment to the reservoir. The solution can be gravity fed from the reservoir to the compartment and a drain in the compartment and a pump for returning the solution from the compartment to the reservoir provided for each of the return conduits, namely the one for the developer for separation negatives and the one for correction masks. Each of the representations of solenoid valves 157–161 actually is intended to represent a pair of valves, that is, one valve for the supply conduit between each compartment and each reservoir 78 and 80 respectively. The valves 157 and 161 for the compartment 50 in which the yellow color transparency films are developed are controlled by the master timer 110 whereas the other said valves are controlled by the delay timers 142–153.

Thus, it may be noted in FIG. 7 that the process selector relays 128 control a relay 162 connected as at 163 for operating a pump 164 associated with each compartment 50–56 for returning the developing solution to the reservoir 78 and connected as at 165 for operation of a pump 166 for returning developing solution from each compartment to the reservoir 80. Each relay 162 also is connected as at 168 to a locking relay and return pump timer 170 which also is connected as at 172 to a cam switch 174. The cam switch 174 also is connected between the main line or supply S and the level detectors 100. The level detectors 100, there being one in each compartment 50–56, are connected for operation between the process selector switches and the locking relay and return pump timer 170. Between the master timer 110 and switch 174 is a cam switch 176 also connected to line S as indicated by line 178, the process selector switches also being connected to source S and the cam switch 176 at juncture 180.

It will be noted that the delay timers 142–153 have been arranged in four groups of three timers, with the groups identified by the legends "Sep. A," "Sep. B," "Mask A" and "Mask B" respectively. The timers in groups "Sep. A" and "Sep. B" represent separate timer programs for developing color separation negatives and the timers in "Mask A" and "Mask B" represent different timer programs for developing color correction negatives. Although the diagrammatic view of FIG. 7 shows separate timer programs or circuits for accomplishing this, the same functions could be accomplished by using only one timer program for developing separation negatives and one timer program for correction masks and means for re-setting the master timer 110 for varying the developing time for the negatives in each instance.

Considering now operation of the circuitry and components illustrated diagrammatically in FIG. 7 where four color separation negatives 90–96 are to be developed. For this purpose, we presume that the timer program for developing is controlled by the delay timers in the group identified as "Sep. A." It will be appreciated that operation of the apparatus will be the same where the other groups of delay timers are used for a different developing timer program. The process selector switch 200 will be presumed to represent the developing program for separation negatives in this instance and it is turned on to switch in the relay 138. The relay 136 is connected thereby into the operating circuit through connections 202 to control the solenoid valves of compartment 50. With the separation negatives carried by carriage 84, the apparatus is turned on by switch 130, for instance, whereupon the motor 116 is energized to move the head and carriage 82—84 along the rails 60 until it engages microswitch 85 and closes it. Cam switch 176 thereupon is closed to energize motor 120 to lower the carriage and the color separation negatives 90–96 into the compartments 50–56 respectively. Meanwhile, relay 138 has switched in the delay timers 142, 143 and 144, with relay 136 having been switched in by the master timer. Each of the delay timers 142, 143, 144 are pre-set according to the desired time-delay interval therefor related to the compartment with which it is operatively associated. Thus, the delay timers do not furnish a voltage output until they reach their pre-set timed out position. The process selector relay 138 also switches in the level indicators 100 of all of the compartments.

When the carriage reaches its lowered position, the valve in the supply line from reservoir 78 to compartment 50 opens and developing fluid 98 is introduced into the compartment. When the developer reaches level indicator 100 in compartment 50, the output of the level indicator shuts off indicating filling of the compartment and the valve in the supply line is closed. After elapse of a short period of time, the compartment 52 is filled with fluid 98 until its level indicator 100 shuts off when the compartment is filled. Thereafter, the compartment 54 is filled and then the compartment 56. Thus, when the yellow separation negative 90 has been immersed in the developer 98 for the full period, the master timer furnishes a voltage to cause energization of the motor 120 to elevate the carriage 84 and remove the negatives 90—96. The carriage then is moved by motor 116 along the rails 60 to the next station, that is reservoir 36 where the negatives are lowered into the short stop solution.

In the meantime, the locking relay and return pump timer 170 are energized by the cam switch 174. The return pump 164 is energized to pump the solution 98 back into the reservoir 78.

The carriage and head move along the rails 60 tripping the provided micro-switches in succession for raising and lowering the carriage in a timed sequence. Upon completing the cycle dictated by the master timer 110, the carriage returns automatically to its starting position of FIG. 1 and the apparatus can be turned off by switch 130.

The general diagrammatic arrangement of FIG. 7 does not show very well known electrical and electro-mechanical means available for controlling operation of the various components of apparatus 20 as described. For instance, during the time that the films to be processed are in the tank, a suitable gas is provided through the agitators or plenums 102 for maintaining the developer fluids uniform in the compartments. Not shown is a pump for circulating water through the jacket 24 for maintaining the developing fluid at the desired temperature. Likewise not shown are the various supply and return arrangements for fluids which are introduced into the other reservoirs, such as reservoirs 36, 38, 40 and 42, which also may be controlled automatically. As for reservoir 34, this is a single compartment process tank which will have gas-agitating means such as plenums 102, and means for supplying replenisher fluid thereinto. The other processing tanks or reservoirs also have gas plenums, but these may be simple air plenums. However, the more intricate arrangement heretofore described in detail will enable the skilled artisan to apply the disclosure to a single tank, such as reservoir 34. In selecting the process for which tank 34 is used, another process selector switch and process selector relay with attendant timer programming can be incorporated into the apparatus 20.

An example of the timer program for developing color separation negatives is as follows: the yellow separation negative 90 remains immersed in solution 98 for six minutes; the red negative 92 for four and one-half minutes; the blue negative 94 for three and one-half minutes and the black negative 96 for approximately two minutes. It will be appreciated that the time intervals specified may vary dependent upon the strength of the developer, the grain of the photo-sensitive emulsion, the degree of contrast of colors desired and such other factors commonly considered in developing color separation negatives.

Although the invention was described in detail showing developing of a single set of negatives, it will be appreciated that either multiple racks can be used or multiple groups or sets of negatives on a single rack can be used to carry out the invention.

An example of the timer arrangement for developing color correction masks is as follows:

Yellow mask—6 minutes
    Red mask—4½ minutes
    Blue mask—3½ minutes
    Black mask—8 minutes For developing screen positives, for instance, in reservoir 34, the film transparencies remain immersed in the developer for about three and one-half minutes.

Thus, use of the compartmentized processing tank 32 can be adapted to processing the other types of photographic masks, as well. Of course, suitable programming means, developer reservoirs, plumbing and process selectors, etc., in the manner described would be incorporated for such processing techniques, but operation of apparatus 20 would be the same.

It is believed that the invention has been described in sufficient detail to enable the skilled artisan to understand the various means cooperating together to initiate and control operation of the apparatus 20. The claims hereto appended point out the invention in relationship of parts and functions they accomplish, it being contemplated that variations in the kind, number and nature of individual electrical and electromechanical parts can be varied within wide limits while still carrying out the functions of the apparatus or elaborating thereon.

What it is desired to secure by Letters Patent is:

1. In a method of developing a set of process color films to be used in process color reproduction; the herein invention comprising, simultaneously inserting each of said films in a separate compartment adapted to hold developer fluid, filling each of said compartments in timed sequence calculated in relation to the length of time each process color film must remain immersed in developer fluid for proper developing thereof commencing with the compartment holding the process color film requiring the longest immersion time and progressing consecutively to the compartment holding the process color film requiring the shortest immersion time, then removing said set of films in unison from the compartments after said longest immersion time has elapsed.

2. In a method of developing a set of process color films to be used in process color reproductions; the herein invention comprising, simultaneously inserting each of said films in a separate compartment adapted to hold developer fluid, filling each of said compartments in timed sequence calculated in relation to the length of time each process color film must remain immersed in developer fluid for proper developing thereof commencing with the compartment holding the process color film requiring the longest immersion time and progressing consecutively to the compartment holding the process color film requiring the shortest immersion time, then removing said set of films in unison from the compartments after said longest immersion time has elapsed and thereafter fixing and washing said set, said developer fluid being gas-agitated after filling of each compartment therewith.

3. In a method of developing a set of process color films to be used in process color reproduction; the herein invention comprising, simultaneously inserting each of said films in a separate compartment adapted to hold developer fluid, filling each of said compartments in timed sequence calculated in relation to the length of time each process color film must remain immersed in developer fluid for proper developing thereof commencing with the compartment holding the process color film requiring the longest immersion time and progressing consecutively to the compartment holding the process color film requiring the shortest immersion time, then removing said set of films in unison from the compartments after said longest immersion time has elapsed and thereafter fixing and washing said set, said developer fluid being pumped out of said compartments subsequent to removal of said set of films therefrom whereby to permit repetition of said method of developing in the same compartments of another set of process films.

4. A method of automatically developing a set of process color films of the character described comprising, suspending each film of the set from a retractile carriage movable along tracks spaced above the open end of a multicompartment processing tank, programming said carriage to move along said tracks to a first station overlying said tank and lowering the carriage to insert each film into a separate compartment, filling each said compartments with developing fluid in a timed-sequence correlated to the immersion time required for the process color film in said compartment, removing said set of films in unison from said compartments after the longest immersion time required has transpired, then moving the carriage progressively along said tracks to stations overlying process tanks for respectively fixing and washing said set of films and lowering and raising said carriage at said stations in accordance with the time required to process said films in said process tanks.

5. A method as described in claim 4 in which said compartments are emptied after removal of the set of films therefrom.

6. A method as described in claim 5 in which bursts of gas are introduced into the developing fluid for agitating same while the process color film is immersed therein.

7. Automatic apparatus for developing a set of process color films to be used in process color reproduction comprising, a series of processing tanks arranged in succession along the length of the apparatus and adapted to hold photographic processing fluids to be used in the developing process, at least one of said tanks comprising a multi-compartmented processing tank, a control head movable along a linear path above the tanks to each of a plurality of stations, each station being aligned with a said processing tank, a retractile carriage movable both with the head and independently of said head when the head reaches a station for lowering and raising the carriage, said carriage adapted to carry said color films thereon, programming means connected to control the respective movements of the head and carriage in accordance with a predetermined developing process to which said color films are to be subjected during a complete cycle of the operation of the apparatus, a developer fluid reservoir, conduit means connected between said reservoir and each of said compartments including timer-controlled valve means for supplying developer fluid independently to each of said compartments, said valve means being rendered operable by said programming means after said head has reached the station aligned with said compartments and the carriage has lowered the process color films into said compartments respectively to effect filling of the compartments in timed-sequence commencing with the compartment holding the process film requiring the longest immersion time in the developing fluid and progressing to the compartment holding the process film requiring the shortest immersion time in said developing fluid, said programming means operable thereafter to retract the carriage to remove the process films from the compartments in unison and actuate movement of the head and carriage respectively along said path to said various stations in succession to complete said developing process.

8. Automatic apparatus as described in claim 7 in which said programming means includes a master timer device for establishing the time sequence of a developing process and process selector means connected to said master timer means for selecting any one of a plurality of different developing processes for which the apparatus is operable.

9. Automatic apparatus as described in claim 7 in which a second developer fluid reservoir and conduit means are provided independently connecting the second reservoir to each of said compartments, said second conduit means having like valve means for filling said compartments sequentially as aforesaid, the first mentioned reservoir containing developer fluid for color separation negatives, the second reservoir containing developer fluid for color correction masks.

10. Automatic apparatus as described in claim 7 in which said head and carriage are returned along said path upon completion of the process by said programming means.

11. Automatic apparatus as described in claim 10 in which means are provided for emptying said compartments after removal of the process color films therefrom for repetition of said cycle of operation.

12. Automatic apparatus as described in claim 10 in which each compartment has a gas-burst device therein rendered operable by the programming means during the time the compartment is filled with developer fluid.

13. Automatic apparatus for concurrently developing a plurality of process color films used in process color reproduction comprising, an elongate tank having a series of reservoirs open at the upper ends thereof and successively arranged along the length of the tank, at least one of said reservoirs being sectioned to provide a series of successive compartments, a control head and guide rail means spaced above the reservoirs along the length of the tank having said head movable therealong, a carriage operatively associated with said head for holding said films, said carriage being movable with said head and independently reciprocable for lowering and raising the carriage relative to said reservoirs, timer means including electrical circuit programming means for controlling movement of the head and carriage in predetermined timed-sequence correlated to a desired developing process for said films which includes lowering the carriage to dispose said films into said compartments simultaneously with each of said films being received in one of said compartments, a developer reservoir, supply conduit means and return conduit means connected between each of said compartments and said developer reservoir, said conduit means each having timer-controlled valve means associated therewith for filling the compartments sequentially so that each film transparency is immersed in developer for a time period calculated to develop the same, said carriage being raised to remove the films from the compartments simultaneously after the longest immersion time period required for any one of said films has elapsed.

14. Apparatus as described in claim 13 in which said return conduit means includes pump means for emptying said compartments subsequent to removal of the process films therefrom.

15. Apparatus as described in claim 13 in which there is a second developer reservoir and supply and conduit means connecting the second developer reservoir to each of said compartments including timer-controlled valve means associated therewith, said programming means connected to actuate filling of said compartments from said second developer reservoir in predetermined sequence similar to that used to fill the compartments sequentially from said first mentioned reservoir whereby the same apparatus can be used to process color separation negatives and color correction masks.

16. Apparatus as described in claim 13 in which gas-plenum means are provided in each compartment, a source of gas connected to said plenums and controlled by the program means for introducing bursts of agitating gas into the compartments when filled with fluid.

17. Apparatus as described in claim 13 in which said timer means includes a master timer device for establishing the time sequence of a developing process and process selector means connected therewith, said programming means includes delay timer relays connected with said selector means selectively to control operation of the valve means in accordance with the process selected.

18. Apparatus as described in claim 13 in which there is a control rail having switch means at spaced intervals along the length thereof, said head and carriage being movable along the control rail to close said switches serially for dictating movement of the head and carriage along said guide rails.

19. In automatic apparatus for processing color separation negative films and photographic masking films, the herein invention comprising, a timer-controlled carriage adapted to carry a complete set of said films of either type, a processing tank having a plurality of compartments open at the upper ends thereof, drive means connected to raise and lower said carriage, a pair of developer fluid reservoirs, each reservoir adapted to hold developing fluid for one of said types of films, conduit means separately connected between each reservoir and each compartment including timer-controlled valve means for opening the respective conduit means to fill said compartments in a predetermined timed-sequence, calculated on the basis each film of a set is required to remain immersed in developer fluid, and master programming means connected to control movement of said carriage to lower the films of a set into said compartments respectively and thereafter actuate said valve means first to fill the compartment having the film requiring the longest immersion time and then the other compartments consecutively in accordance with the required immersion time of the particular film therein until all the compartments are filled, said programming means thereafter operable to raise said carriage after expiration of said longest immersion time.

20. Structure as described in claim 19 in which said programming means includes a plurality of process selector means and process selector electromagnetic timer devices connected therewith and said valve means for controlling operation of the apparatus.

References Cited in the file of this patent

UNITED STATES PATENTS

| | | |
|---|---|---|
| 1,254,300 | Baker | Jan. 22, 1918 |
| 2,764,074 | Rosenberg | Sept. 25, 1956 |
| 2,823,595 | McFadden et al. | Feb. 18, 1958 |
| 3,000,288 | Winnek | Sept. 19, 1961 |

FOREIGN PATENTS

| | | |
|---|---|---|
| 720,277 | Great Britain | Dec. 15, 1954 |